United States Patent
Singh et al.

(10) Patent No.: US 12,189,729 B2
(45) Date of Patent: Jan. 7, 2025

(54) VOICE AND FACE BANK TO CURB FUTURE ARTIFICIAL INTELLIGENCE CONTENT FRAUD

(71) Applicant: Avaya Management L.P., Durham, NC (US)

(72) Inventors: Prateek Singh, Noida (IN); Divyarajsinh Jadeja, Pune (IN); Mittali Jangid, Gujarat (IN)

(73) Assignee: Avaya Management L.P., Durham, NC (US)

( * ) Notice: Subject to any disclaimer, the term of this patent is extended or adjusted under 35 U.S.C. 154(b) by 161 days.

(21) Appl. No.: 17/868,548

(22) Filed: Jul. 19, 2022

(65) Prior Publication Data

US 2024/0028676 A1    Jan. 25, 2024

(51) Int. Cl.
G06F 21/31    (2013.01)

(52) U.S. Cl.
CPC .................................. G06F 21/31 (2013.01)

(58) Field of Classification Search
CPC ...................................................... G06F 21/31
USPC ............................................................. 726/7
See application file for complete search history.

(56) References Cited

U.S. PATENT DOCUMENTS

| | | | |
|---|---|---|---|
| 10,432,795 B1 * | 10/2019 | Cordell | H04M 3/42068 |
| 10,594,689 B1 * | 3/2020 | Weaver | H04L 9/3231 |
| 11,562,451 B1 * | 1/2023 | Kozlowski, III | G06F 16/27 |
| 2009/0195707 A1 * | 8/2009 | Mizushima | H04N 9/3111 348/744 |
| 2013/0326589 A1 * | 12/2013 | Butler | H04W 4/02 726/4 |
| 2017/0149560 A1 | 5/2017 | Shah | |
| 2018/0096175 A1 * | 4/2018 | Schmeling | G06F 1/3206 |
| 2018/0199136 A1 * | 7/2018 | Sculley | H04R 1/1016 |
| 2020/0075056 A1 * | 3/2020 | Yang | G11B 20/10527 |
| 2021/0165824 A1 * | 6/2021 | Xu | G06F 16/64 |
| 2021/0233204 A1 * | 7/2021 | Alattar | G06T 1/005 |
| 2022/0253562 A1 * | 8/2022 | Roshanzamir | H04L 9/3239 |
| 2022/0391899 A1 * | 12/2022 | Lyren | G06Q 20/085 |
| 2022/0415329 A1 * | 12/2022 | Park | G10L 15/26 |
| 2023/0017855 A1 * | 1/2023 | Kikinis | G06Q 20/3827 |
| 2023/0267941 A1 * | 8/2023 | Nagpal | G10L 21/007 |
| 2023/0403418 A1 * | 12/2023 | Regairaz | H04L 65/80 |

FOREIGN PATENT DOCUMENTS

WO    WO 2021/101096    5/2021

* cited by examiner

*Primary Examiner* — David P Zarka
(74) *Attorney, Agent, or Firm* — Sheridan Ross P.C.

(57) ABSTRACT

A method for processing multimedia content for authentication and authenticating the multimedia content includes registering a scheduled event, creating a mapping between the scheduled event and a registrant of the scheduled event and in response to creating the mapping between the scheduled event and the registrant, issuing a request to add a block in a blockchain for the mapping. The method also includes in response to the request, receiving, a block identifier, generating a start code for one or more modulation schemes based on the block identifier, receiving multimedia content generated based on the scheduled event and modifying the multimedia content based on the one or more modulation schemes for distribution of the multimedia content.

20 Claims, 6 Drawing Sheets

VOICE AND FACE BANK TO CURB FUTURE ARTIFICIAL INTELLIGENCE CONTENT FRAUD

The present disclosure relates generally to systems and methods for processing multimedia content and particularly relates to systems and methods for processing the multimedia content for authentication and authenticating the multimedia content.

BACKGROUND

Currently, there exist concerns regarding the authenticity of transmitted content such as multimedia content (e.g., text, audio, video and combinations thereof) over the Internet or other types of networks. Multimedia content may include, but is not limited to, news multimedia content (distributed over the Internet, radio, television, telephone, etc.), conference calls, call center calls, etc. With the advent of Artificial Intelligence (AI) auto-generating multimedia technologies, it has become common for fake news multimedia content of celebrities, famous politicians, or ordinary people to be released.

For example, fake news multimedia content can be auto-generated using AI technologies from original multimedia content. In particular, the Internet has enabled a non-linear media distribution model that does not guarantee the authenticity of the news. Internet users can digitally alter news of authentic sources and re-distribute them through social media networks (e.g., YouTube®, Facebook®, Twitter®, etc.) as if they were originals coming from legitimate sources. Usually, the alteration is done in three different ways. The first is known as face-swap, in which the original face in the video is replaced with another face. The second is known as lip-sync, in which the speaker's voice is replaced by the voice of an impersonator. The third type is known as puppet-master, in which the person in the video is animated to do a desired action.

The news authenticity problem is exacerbated with the advent of deep learning technology. New powerful video creation software tools have recently been developed using deep learning and made available on the Internet. These tools made the talents and the expensive software and hardware, usually used in the movie industry, no longer required for video content altering. They run on an ordinary personal computer and their use is straightforward. A novice user can use them to quickly alter the looks, the speech, or the actions of the people filmed in any video and generate fake videos that look convincingly real. The generated fake videos are commonly known as deepfakes and are pervasive on the Internet.

If generating fake multimedia content is not checked from the granularity level, it will be difficult to verify whether an event actually took place and/or whether the words from the multimedia content are the actual words spoken by the person captured in the multimedia content. One conventional technique used to address this issue involves checking a video to see if the video is from the actual person by voice matching and face matching. The basic issue with the conventional technique is that it is unable to authenticate a voice and video against a real event and verify its authenticity.

Therefore, there is a need for systems and methods for processing multimedia content for authentication and authenticating the multimedia content.

SUMMARY

These and other needs are addressed by the various embodiments and configurations of the present disclosure. The present disclosure can provide a number of advantages depending on the particular configuration. These and other advantages will be apparent from the disclosure contained therein.

The phrases "at least one", "one or more", and "and/or" are open-ended expressions that are both conjunctive and disjunctive in operation. For example, each of the expressions "at least one of A, B and C", "at least one of A, B or C", "one or more of A, B and C", "one or more of A, B or C" and "A, B and/or C" means A alone, B alone, C alone, A and B together, A and C together, B and C together or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "conference" as used herein refers to any communication or set of communications, whether including audio video, text or other multimedia data, between two or more communication endpoints and/or users. Typically, a conference includes two or more communication endpoints. The terms "conference" and "conference call" are used interchangeably throughout the specification.

The term "communication device" or "communication endpoint" as used herein refers to any hardware device and/or software operable to engage in a communication session. For example, a communication device can be an Internet Protocol (IP)-enabled phone, a desktop phone, a cellular phone, a personal digital assistant, a soil-client telephone program executing on a computer system, etc. IP-capable hard- or softphone can be modified to perform the operations according to embodiments of the present disclosure.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIG. 1. Generally, a network can be a Local Area Network (LAN), a Wide Area Network. (WAN), a wireless LAN, a wireless WAN, the Internet, etc. that receives and transmits messages or data between devices. A network may communicate in any format or protocol known in the art, such as, Transmission Control Protocol/IP (TCP/IP), 802.11g, 802.11n, Bluetooth or other formats or protocols.

The term "communication event" and its inflected forms includes: (i) a voice communication event, including but not limited to a voice telephone call or session, the event being in a voice media format or (ii) a visual communication event, the event being in a video media format or an image-based media format or (iii) a textual communication event, including but not limited to instant messaging, internet relay chat, e-mail, short-message-service, Usenet-like postings, etc., the event being in a text media format or (iv) any combination of (i), (ii), and (iii).

The term "communication system" or "communication network" and variations thereof, as used herein, can refer to a collection of communication components capable of one or more of transmission, relay, interconnect, control or otherwise manipulate information or data from at least one transmitter to at least one receiver. As such, the communication may include a range of systems supporting point-to-point or broadcasting of the information or data. A communication system may refer to the collection of individual communication hardware as well as the interconnects associated with and connecting the individual communication hardware. Communication hardware may refer to dedicated communication hardware or may refer to a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. The computer-readable storage medium may be, for example, but not limited to, an electronic, magnetic, optical, electromagnetic, infrared or semiconductor system, apparatus or device or any suitable combination of the foregoing. More specific examples (a non-exhaustive list) of the computer-readable storage medium would include the following: an electrical connection having one or more wires, a portable computer diskette, a hard disk, etc. Such a medium may take many forms, including but not limited to, non-volatile media, volatile media and transmission media. Non-volatile media includes, for example, Non-Volatile Random-Access Memory (NVRAM) or magnetic or optical disks. Volatile media includes dynamic memory, such as main memory. Common forms of computer-readable media include, for example, a floppy disk, a flexible disk, a hard disk, a magnetic tape or any other magnetic medium, magneto-optical medium, a Compact Disk—Read Only Memory (CD-ROM), any other optical medium, punch cards, a paper tape, any other physical medium with patterns of holes, a RAM, a Programmable ROM (PROM), an Erasable PROM (EPROM), a Flash-EPROM, a solid state medium like a memory card, any other memory chip or cartridge, a carrier wave as described hereinafter or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object oriented and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied on a computer readable medium may be transmitted using any appropriate medium, including but not limited to wireless, wireline, optical fiber cable, Radio-frequency (RF), etc. or any suitable combination of the foregoing.

A "database" is an organized collection of data held in a computer. The data is typically organized to model relevant aspects of reality (for example, the availability of specific types of inventories), in a way that supports processes requiring this information (for example, finding a specified type of inventory). The organization schema or model for the data can, for example, be hierarchical, network, relational, entity-relationship, object, document, XML, entity-attribute-value model, star schema, object-relational, associative, multidimensional, multi-value, semantic and other database designs. Database types include, for example, active, cloud, data warehouse, deductive, distributed, document-oriented, embedded, end-user, federated, graph, hypertext, hypermedia, in-memory, knowledge base, mobile, operational, parallel, probabilistic, real-time, spatial, temporal, terminology-oriented and unstructured databases. Database management system (DBMS)s are specially designed applications that interact with the user, other applications, and the database itself to capture and analyze data.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a Merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and includes a version field, the hash of the previous block, the root hash of the Merkle tree of all transactions (or information or data) in the block, the current time, and the difficulty level. The nonce can be stored in an extranonce field, which is stored as the left most leaf node in the Merkle tree. The counter parameter is often small at 32-bits so each time it wraps the extranonce field must be incremented (or otherwise changed) to avoid repeating work. When validating or verifying a block, the hashcash algorithm repeatedly hashes the block header while incrementing the counter & extranonce fields. Incrementing the extranonce field entails recomputing the Merkle tree, as the transaction or other information is the left most leaf node. The body of the block contains the transactions or other information. These are hashed only indirectly through the Merkle root.

The term "distributed ledger" as described herein includes a plurality of separate blockchains that are stored on different network elements, such as, on separate servers, on separate communication managers, in separate databases and/or on separate network elements, on separate devices, and/or the like. The separate blockchains may reside on different types of network elements. For example, the blockchains may reside on a communication manager and a database on another network element, such as a router. The separate blockchains are copies.

The distributed ledger is setup so that when there is any change made to a blockchain (i.e., a newly added block based on a transaction) that the changes are automatically sent to the other elements of the distributed ledger. If the blockchain has been changed (e.g., where a blockchain was tampered with), the change is immediately detected by the distributed ledger. When a change is made to a blockchain, a signature is verified based on a signature of the blockchain. When a node with the blockchain verifies that the newly added block is valid, it is broadcast to the other nodes. When more than a specific percentage of the nodes agree that the block is valid, they all add the new block to the blockchain.

The terms "determine", "calculate" and "compute" and variations thereof, are used interchangeably and include any type of methodology, process, mathematical operation or technique.

The term "electronic address" refers to any contactable address, including a telephone number, instant message handle, e-mail address, Universal Resource Locator (URL), Universal Resource Identifier (URI), Address of Record (AOR), electronic alias in a database, like addresses and combinations thereof.

An "enterprise" refers to a business and/or governmental organization, such as a corporation, partnership, joint venture, agency, military branch and the like.

A geographic information system (GIS) is a system to capture, store, manipulate, analyze, manage and present all types of geographical data. A GIS can be thought of as a system— it digitally makes and "manipulates" spatial areas that may be jurisdictional, purpose or application-oriented. In a general sense, GIS describes any information system that integrates, stores, edits, analyzes, shares and displays geographic information for informing decision making.

The terms "instant message" and "instant messaging" refer to a form of real-time text communication between two or more people, typically based on typed text. Instant messaging can be a communication event.

The term "internet search engine" refers to a web search engine designed to search for information on the World Wide Web and File Transfer Protocol (FTP) servers. The search results are generally presented in a list of results often referred to as Search Engine Results Pages (SERPS). The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider) — an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The term "means" as used herein shall be given its broadest possible interpretation in accordance with 35 U.S.C., Section 112, Paragraph 6. Accordingly, a claim incorporating the term "means" shall cover all structures, materials or acts set forth herein, and all of the equivalents thereof. Further, the structures, materials or acts and the equivalents thereof shall include all those described in the summary of the invention, brief description of the drawings, detailed description, abstract and claims themselves.

The term "module" as used herein refers to any known or later developed hardware, software, firmware, artificial intelligence, fuzzy logic or combination of hardware and software that is capable of performing the functionality associated with that element.

A "server" is a computational system (e.g., having both software and suitable computer hardware) to respond to requests across a computer network to provide, or assist in providing, a network service. Servers can be run on a dedicated computer, which is also often referred to as "the server", but many networked computers are capable of hosting servers. In many cases, a computer can provide several services and have several servers running. Servers commonly operate within a client-server architecture, in which servers are computer programs running to serve the requests of other programs, namely the clients. The clients typically connect to the server through the network but may run on the same computer. In the context of IP networking, a server is often a program that operates as a socket listener. An alternative model, the peer-to-peer networking module, enables all computers to act as either a server or client, as needed. Servers often provide essential services across a network, either to private users inside a large organization or to public users via the Internet.

The term "sound" or "sounds" as used herein refers to vibrations (changes in pressure) that travel through a gas, liquid or solid at various frequencies. Sound(s) can be measured as differences in pressure over time and include frequencies that are audible and inaudible to humans and other animals. Sound(s) may also be referred to as frequencies herein.

The terms "audio output level" and "volume" are used interchangeably a refer to the amplitude of sound produced when applied to a sound producing device.

The term "multi-party" as used herein may refer to communications involving at least two parties. Examples of multi-party calls may include, but are in no way limited to, person-to-person calls, telephone calls, conference calls, communications between multiple participants and the like.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit" "module" or "system". Any combination of one or more computer readable medium(s) may be utilized. The computer readable medium may be a computer readable signal medium or a computer readable storage medium.

Examples of the processors as described herein may include, but are not limited to, at least one of Qualcomm® Snapdragon® 800 and 801, Qualcomm® Snapdragon® 610 and 615 with 4G LIE Integration and 64-bit computing, Apple® A7 processor with 64-bit architecture, Apple® MI motion coprocessors, Samsung® Exynos® series, the Intel® Core™ family of processors, the Intel® Xeon®, family of processors, the Intel® Atom™ family of processors, the Intel Itanium® family of processors, Intel® Core® i5-4670K and i7-4770K 22 nm Haswell, Intel® Core® i5-3570K 22 nm Ivy' Bridge, the AMD® FX™ family of processors, AMD® FX-4300, FX-6300 and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, other industry-equivalent processors, and may perform computational functions using any known or future-developed standard, instruction set, libraries and/or architecture.

The ensuing description provides embodiments only and is not intended to limit the scope, applicability or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description including an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

The preceding is a simplified summary of the disclosure to provide an understanding of some aspects of the disclosure. This summary is neither an extensive nor exhaustive overview of the disclosure and its various aspects, embodiments and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The present disclosure will be described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements without departing from the spirit and scope of the present disclosure.

According to embodiments of the present disclosure, a method for processing multimedia content for authentication and authenticating the multimedia content includes registering, by a processor, a scheduled event, creating, by the processor, a mapping between the scheduled event and a registrant of the scheduled event and in response to creating the mapping between the scheduled event and the registrant, issuing, by the processor, a request to add a block in a blockchain for the mapping. The method also includes in response to the request, receiving by the processor, a block identifier, generating, by the processor, a start code for one or more modulation schemes based on the block identifier, receiving, by the processor, multimedia content generated based on the scheduled event and modifying, by the processor, the multimedia content based on the one or more modulation schemes for distribution of the multimedia content.

According to embodiments of the present disclosure, a live event to take place (e.g., a future event) is requested to be registered. For example, a live event can be a voice conference call to be conducted between a group of users, a speech to be given by a congressman, etc. Mapping is performed between the registered scheduled event and the user that requested registration of the scheduled event (e.g., the speaker, one or more users of the group, etc.). Other information regarding the live event and the user that requested registration can also be included. A block is added to a blockchain with the information about the registered scheduled event. A code for modulating the future video and audio from the live event also begins. Once registration has been completed, the user (e.g., the registrant) is provided with a link or an IP address to upload the multimedia content to be generated from the live event. The modulating keeps changing every 5-6 seconds.

A block is added to a blockchain with the information about the scheduled event, the registrant of the scheduled event and other identifying information. The blockchain with the information is sent to a distributed ledger. The distributed ledger is where copies of the blockchain are stored on multiple nodes on one or more networks. By having multiple copies distributed in one or more networks, it is much more difficult to generate deepfakes and alter video and audio. Moreover, by adding the modulations in the multimedia content this will eliminate the deepfakes.

Figure 1:
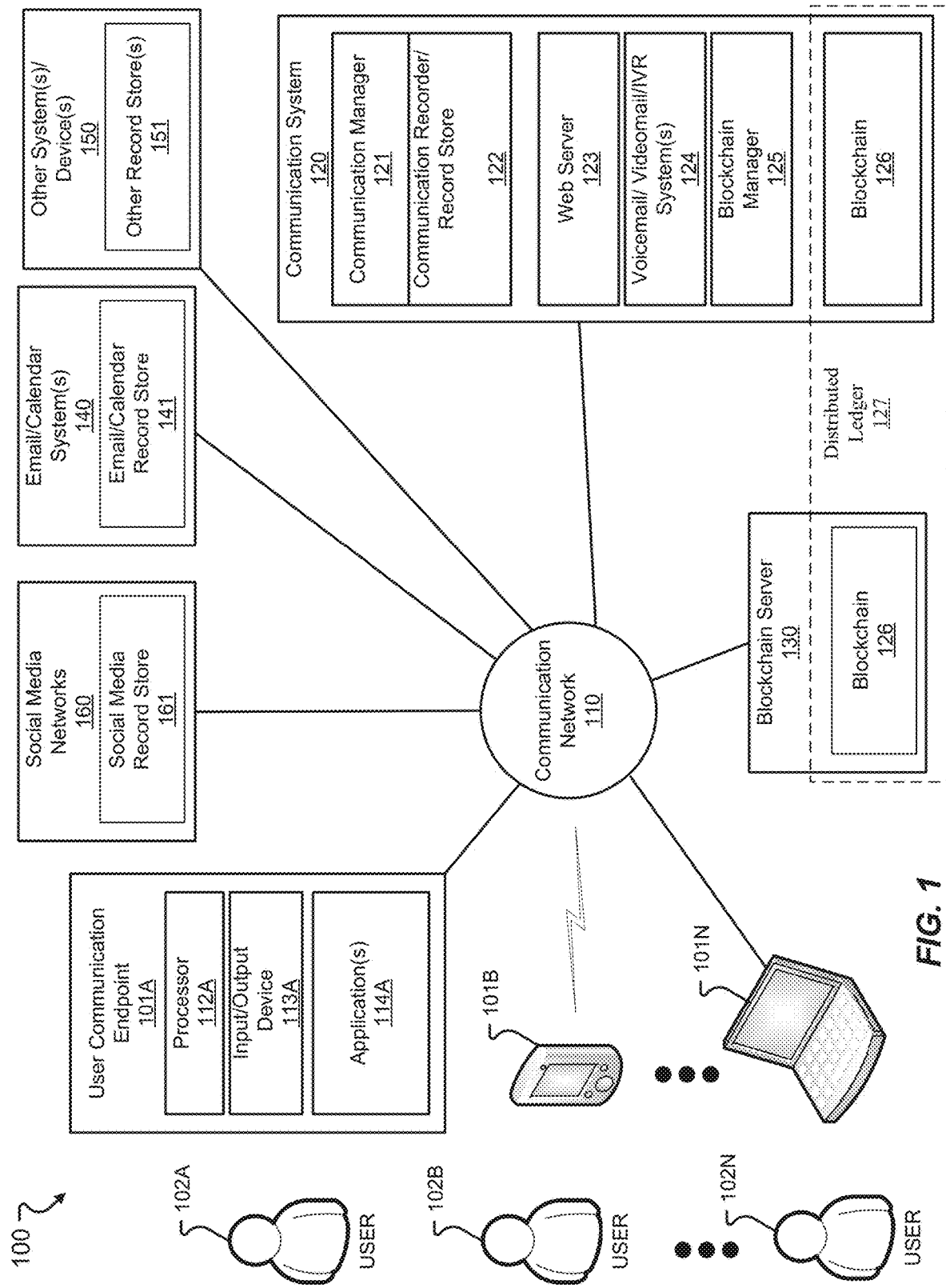
FIG. 1 is a block diagram of a first illustrative computer network system for processing multimedia content for authentication and authenticating the multimedia content using a distributed ledger and blockchain according to an embodiment of the present disclosure.

FIG. 1 is a block diagram of a first illustrative computer network system 100 for processing multimedia content for authentication and authenticating the multimedia content using a distributed ledger 127 and blockchain 126 according to an embodiment of the present disclosure. The first illustrative computer network system 100 includes user communication devices or endpoints 101A-101N, a communication network 110, a communication system 120, a blockchain server 130, social media networks 160, email/calendar systems) 140 and other system(s) and device(s) 150. In addition, the user communication endpoints 101A-101N also have users 102A-102N.

The user communication endpoints 101A-101N can be or may include any user communication endpoint device that can communicate on the communication network 110, such as a Personal Computer (PC), a telephone, a video system, a cellular telephone, a Personal Digital Assistant (PDA), a tablet device, a notebook device, a smartphone, and/or the like. The user communication endpoints 101A-101N are user devices at which a communication session ends. The user communication endpoints 101A-101N are not network elements that facilitate and/or relay a communication session in the communication network 110, such as a communication manager 121 or router.

The term "user communication endpoint" as used herein is not limiting and may be referred to as a user device and mobile device, and variations thereof. A user communication endpoint, as used herein, may include any type of device capable of communicating with one or more of another device and/or across a network, via a communications protocol, and the like. Examples of an illustrative communication device may include, but are not limited to, any device with a sound and/or pressure receiver, a cellular phone, a smart phone, a telephone, a handheld computer, a laptop, a netbook, a notebook computer, a subnotebook, a tablet computer, a scanner, a portable gaming device, a pager, a Global Positioning System (GPS) module, a portable music player and other sound and/or pressure receiving devices. A communication device does not have to be Internet-enabled and/or network-connected. In general, each communication device may provide many capabilities to one or more users who desire to use or interact with the communication system 120. For example, a user may access the communication system 120 utilizing the communication network 110.

As shown in FIG. 1, any number of user communication endpoints 101A-101N may be connected to communication network 110. The user communication endpoint 101A further includes a processor 112A, an input/output device 113A and one or more application(s) 114A stored in a memory (not shown). The processor 102A can be or may include any hardware processor, such as a micro-controller, an application specific processor, a multi-core processor, a digital signaling processor, and/or the like.

The input/output device 113A may include one or more audio input devices, audio output devices, video input devices and/or video output devices. In some embodiments of the present disclosure, the audio input/output devices may be separate from the user communication device 101A. For example, an audio input device may include, but is not limited to, a receiver microphone used by the user communication device 101A, as part of the user communication device 101A and/or an accessory (e.g., a headset, etc.) to convey audio to one or more of the other user communication devices 101B-101N and the communication system 120. In some cases, the audio output device may include, but is not limited to speakers, which are part of a headset, standalone speakers or speakers integrated into the user communication devices 101A-101N.

Video input devices, such as cameras may correspond to an electronic device capable of capturing and/or processing an image and/or a video content of a live event for further transmission to the communication system 120 as discussed in greater detail below. The cameras may include suitable logic, circuitry, interfaces and/or code that may be operable to capture and/or process an image and/or a video content. In an embodiment of the present disclosure, the cameras may be a Pan-Tilt-Zoom (PTZ) camera. In an embodiment of the present disclosure, the PTZ of the cameras may be controlled mechanically. In another embodiment, the PTZ of the cameras may be electronically controlled using solid state components.

In an embodiment of the present disclosure, the cameras may be high resolution cameras that capture high-resolution wide-angle images and/or videos. In another embodiment of the present disclosure, the cameras may be built from a plurality of smaller-resolution cameras. The plurality of smaller resolution cameras may be built into a single housing. In another embodiment, the plurality of smaller resolution cameras may be separate. In such a case, the output signals of the plurality of smaller resolution cameras may be calibrated. Images and/or videos captured by the plurality of smaller resolution cameras may be combined into a single high-resolution image. In an embodiment of the present disclosure, the plurality of smaller resolution cameras may be set up such that the field of view of the plurality of the smaller resolution cameras may overlap so that their combined output signal results in a high-resolution image.

According to further embodiments of the present disclosure, the input/output device 113A can include a display device that can be or may include any hardware display that can display information to user 102A. For example, the display may be a Light Emitting Diode (LED) display, a plasma display, a liquid crystal display, a cathode ray tube, a projector, and/or the like. Moreover, the input/output device 113A can be or may include any hardware device that can convey information to and from a user, such as touch screen, a mouse, a trackball, a vibrator, an accelerometer, a sensor and/or the like.

Capabilities enabling the disclosed systems and methods may be provided by one or more user communication devices 101A-101N through hardware or software installed on the user communication devices 101A-101N, such as application(s)114A. For example, the application(s)114A may be in the form of a conferencing application, a multimedia content generation application, a multimedia authenticator verification portal application, etc., as discussed in greater detail below. The application(s) 114A may be executed by one or more of the communication devices (e.g., the user communication devices 101A-101N) and may execute all or part of the communication system 120 at one or more of the user communication devices 101A-101N. Accordingly, user 102A may utilize the application(s) 114A to access and/or provide data to communication records store 122 or other database(s) (not shown). For example, user 102A may utilize the application(s) 114A executing on the user communication device 101A to register an event that is to take place in the future (e.g., a scheduled event). Such data may be received at the communication system 120 and processed by the communication manager 121 and stored in the communication record store 122. The data/information may be associated with one or more profiles associated with the user 102A. User 102A may also utilize the application(s) 114A executing on the user communication device 101A to generate multimedia content associated with the scheduled event. The multimedia content associated with the scheduled event may be processed by the communication manager 121 to include modulation techniques for authentication purposes. These modulation techniques may be stored in communication record store or other database(s) and associated with user 102A's user profile. The multimedia authenticator verification portal application can be used to access communication system 120 to authenticate any multimedia content.

Although only user communication endpoint 101A is illustrated and described in detail above, each of the user communication endpoints 101B-101N includes the same features as user communication endpoint 101A illustrated and described above and therefore their illustration and description has been omitted.

The communication network 110 can be or may include any collection of communication equipment that can send and receive electronic communications. The communication network 110 may be packet-switched and/or circuit switched. An illustrative communication network 110 includes, without limitation, the Internet, a Wide Area Network (WAN), a Local Area Network (LAN), a Voice over IP Network (VOIP), the Public Switched Telephone Network (PSTN), a Plain Old. Telephone Service (POTS) network, a packet switched network, a circuit switched network, a cellular network, a corporate network, a combination of these, and the like. The communication network 110 can use a variety of electronic protocols, such as Ethernet, Internet Protocol (IP), Session Initiation Protocol (SIP), Integrated Services Digital Network (ISDN), video protocols, instant Messaging (IM) protocols, and/or the like. Thus, the communication network 110 is an electronic communication network configured to carry messages via packets and/or circuit switched communications.

The Internet is an example of the communication network 110 that constitutes an Internet Protocol (IP) network including many computers, computing networks, and other communication devices located all over the world, which are connected through many telephone systems and other means. In one configuration, the communication network 110 is a public network supporting the Transmission Control Protocol/IP (TCP/IP) suite of protocols. Communications supported by the communication network 116 include real-time, near-real-time, and non-real-time communications. For instance, the communication network 110 may support voice, video, text, web-conferencing, or any combination of media. Moreover, the communication network 110 may include a number of different communication media such as coaxial cable, copper cable/wire, fiber-optic cable, antennas for transmitting/receiving wireless messages and combinations thereof. In addition, it can be appreciated that the communication network 110 need not be limited to any one network type, and instead may include a number of different networks and/or network types. It should be appreciated that the communication network 110 may be distributed. Although embodiments of the present disclosure will refer to one communication network 110, it should be appreciated that the embodiments claimed herein are not so limited. For instance, more than one communication network 110 may be joined by combinations of servers and networks.

The communication system 120 can be or may include any hardware coupled with firmware/software that can provide and manage communication sessions on the communication network 110, such as, a Private Branch Exchange (PBX), a router, a proxy server, a central office switch, a contact center, and/or the like. The communication system 120 further includes a communication manager 121, a communication recorder/record store 122, a web server 123, a voicemail/videomail/Interactive Voice Response (IVR) system(s) 124, a blockchain manager 125, and a blockchain 126.

The communication manager 121 can be or may include any hardware coupled with firmware/software that can manage and help establish communication sessions on the communication network 110, such as, a PBX, a session manager, a router, a proxy server, and/or the like. The communication manager 121 can manage various types of communication sessions, such as voice, video, multimedia (a type of video), virtual reality (a type of video), gaming (a type of video), instant Messaging (IM), email, text messaging, and/or the like. When the communication session is a conference call, for example, the conference call can be in one or more medias, such as voice, video, multimedia, IM, virtual reality (e.g., a gaming session), and/or the like. The communication manager 121 may include a mixer for mixing audio, video, and/or virtual reality in a communication session. The communication manager 121 may establish a conference call between two or more users 102A-102N.

The communication recorder/record store 122 can be or may include any hardware coupled with firmware/sot ware that can record a communication session such as a conference call, for example. The communication recorder/record 122 may record various types of conference calls, such as, a voicemail, a videomail, a voice conference call, a video conference call (e.g., with a corresponding audio stream), a voice contact center conference call, a video contact center conference call, a multimedia conference call, a virtual reality conference call, a gaming conference call, an interactive voice response system interaction, an instant messaging conference call, a contact center instant messaging conference call, and/or the like. The communication recorder/record store 122 also stores other types of recordings associated with the web server 124, the voicemail/videomail/IVR system(s) 124 as discussed in greater detail below. Although the communication recorder/record store 122 is shown in the communication system 120, the communication recorder/record store 122 may reside outside the communication system 120 (e.g., on the communication network 110).

The web server 123 can be or may include any web server that can provide web pages to the user communication devices 101A-101N. The voicemail/videomail/IVR system(s) 124 can be or may include any hardware coupled with software that can record and/or store voice/video mails (e.g., a conference call recording). For example, the voicemail/videomail/IVR system(s) 124 may record voicemails/video-mails left for an individual user 102. The voicemail/videomail functionality may be in a separate device than the IVR functionality. In addition, the voicemail/videomail/IVR system(s) 124 may record a user's interaction with an IVR system (also a conference call recording). For example, the IVR system of the voicemail/videomail/IVR system(s) 124 may be in a contact center that records a conversation (video and/or audio) between a user 102 and the IVR system or a user 102 and a contact agent.

The social media network(s) 160 can be or may include any kind of social media network, such as Facebook®, Twitter®, Myspace®, LinkedIn®, and/or the like. The social media network(s) 160 further comprise a social media record store 161. The social media record store 161 may include various types of information, such as, text or video of a post on the social media network 160, a number of posts by a person on the social media network 160, a date of a post on the social media network 160, a time of a post on the social media network 160, a number of followers of the person on the social media network 160, a subject of a post on the social media network 160, a length of a post on the social media network 160, an organization of the person who posted on the social media network 160, a document posted on the social media network 160 (e.g., a video), a time/date of posting of the document, and/or the like.

The email/calendar system 140 can be or may include one or more email/calendar systems 140, such as Outlook®, Gmail®, and/or the like. The email/calendar system 140 further includes an email/calendar record store 141. The email/calendar record store 141 can be or may include various records associated with an email/calendar, such as, content of an email, an email sender field, an email recipient field, an email carbon copy field, an email blind copy field, a person's name that is closer to a head of the email recipient field, a latest sender in an email thread, a more active sender in the email thread, a date of the email, a time of the email, an organization of a sender of the email, an organization of a recipient of the email, a number of emails within a time period, a subject of the email, an attachment in the email, a subject of the attachment in the email, a type of the attachment in the email, a time of a calendar event, a date of the calendar event, participants in the calendar event, and/or the like.

The other system(s)/device(s) 150 can be or may include any hardware device/system coupled with software that may have information that is useful in identifying a user, such as a gaming system, a virtual reality system, a contact center, a facial recognition scanner, a trouble ticket system, a text messaging system, a printer, a scanner, a fax machine, a pager, a smartphone, a web site, a camera, a biometric scanner, and/or the like. The other system(s)/device(s) 150 further include another record store 151. According to an alternative embodiment of the present disclosure, other system(s)/devices 150 can include enterprise applications that may be instant messaging tools such as Microsoft Teams, Skype, communication platforms such as Slack or JIRA service management systems, or collaboration tools such as the Confluence platform.

The other record store 151 can be or may include any electronic memory that can store information. The type of information in the other record store, can be or may include information, such as, a participant in a video game, a participant in a virtual reality meeting, a time of a virtual reality meeting, a date of a virtual reality meeting, a length of the virtual reality meeting, a facial recognition of a participant, a caller to a contact center, a sender of a text message, a recipient of the text message, a subject of the text message, a date a document was printed, a time the document was printed, a date/time of a faxed document, a time a document was created, a date a document was scanned, a time a document was scanned, a date of a document that identifies an issue (e.g., in a contact center or organization), a time of a document that identifies in issue, a creator of a document that identifies an issue, and/or the like.

The blockchain manager 125 can be or may include any firmware/software that can manage a blockchain 126 in a distributed ledger 127. In one embodiment of the present disclosure, the blockchain manager 125 may reside external to the communication system 120 or may be distributed. For example, the blockchain manager 125 may be distributed between the communication system 120 and the blockchain server 130.

The blockchain 126 is associated with registered scheduled events and registered modulation schemes or techniques applied to multimedia content for the registered scheduled event. The registered scheduled events and the registered techniques are stored in the communication record store 122 as discussed in greater detail below. Because of the distributed ledger 127, if one blockchain 126-126 becomes compromised, the compromised blockchain 126 can be automatically detected based on signatures of blocks in the blockchain 126. For example, if a user tries to delete a block from the blockchain 126 (e.g, a block for a registered scheduled event by manipulating the multimedia content) in the communication system 120, the distributed ledger 127 can automatically detect the change because a signature made for the new blockchain 126 with the new block will not match the blockchain 126 in the blockchain server 130. As shown in FIG. 1, there are two copies of the blockchain 126 in the distributed ledger 127. However, there may be any number of copies of the blockchain 126 in the distributed ledger 127.

In one embodiment, the blockchain 126 in the communication system 120 may have different user access privileges than the blockchain 126 in the blockchain server 130. This prevents a single administrator from being able to change both blockchains 126 to try and modify a blockchain 126.

The blockchain 126 typically does not include large blocks of information because of the difficulty of verifying large blocks of information. For example, multimedia content (e.g., a video, an image, a sound recording) of an event taking place such as a conference call, a live news conference, etc. may be very large and require large amounts of processing power to compare blockchains 126 in a distributed ledger 127. One way to overcome this issue is to only stored the one or more modulation schemes associated with the registered scheduled event.

The blockchain server 130 is any server/network element that can store the blockchain 126. For example, the blockchain server 130 may be on a router, a server, in the social media networks 160, the email calendar system(s)140, the voicemails/videomail/IVR system(s) 124, other system(s)/device(s) 150, and/or the like.

Figure 2:
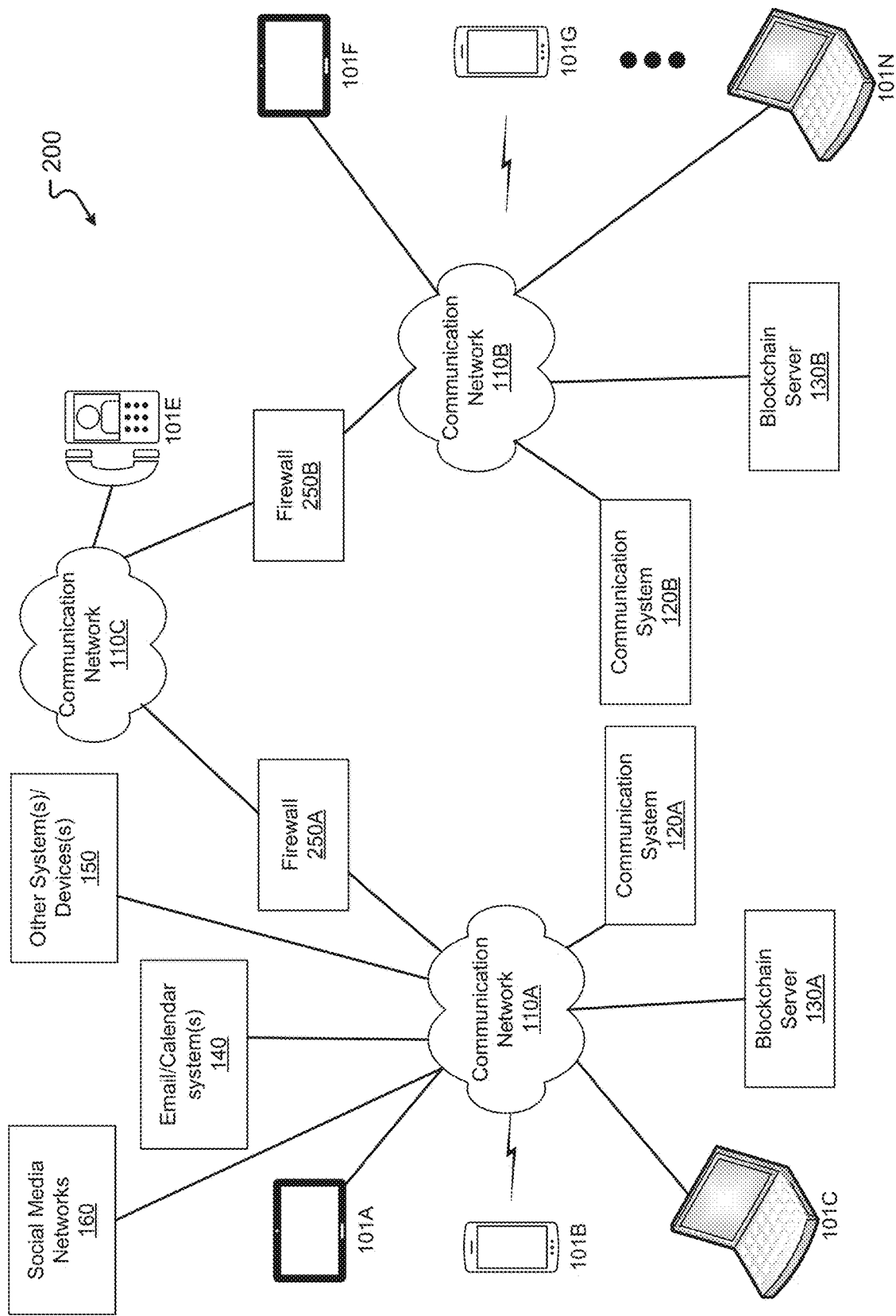
FIG. 2 is a block diagram of a second illustrative computer network system for processing the multimedia content for authentication and authenticating the multimedia content using a distributed ledger and blockchain according to an embodiment of the present disclosure.

FIG. 2 is a block diagram of a second illustrative computer network system 200 for processing the multimedia content for authentication and authenticating the multimedia content using a distributed ledger 127 and blockchain 126 according to an embodiment of the present disclosure. The second illustrative computer network system 200 includes the user communication endpoints 101A-101N, communication networks 110A-110C, communication systems 120A-120B, blockchain servers 130A-130B, social media networks 160, email/calendar system(s) 140, other system(s)/ device(s) 150, and firewalls 250A-250B.

Although not shown in FIG. 2 for convenience, the communication systems 120A-120B typically include the elements 121-125 as well as other elements as discussed in greater detail with FIG. 3A. However, both the communication systems 120A-120B may not have all of the elements 121-125. For example, one or both of the communication systems 120A-120B may not have a web server 123, a voicemails/videomail/IVR system(s) 124 and/or a blockchain manager 125.

Although not shown in FIG. 2 for convenience, the blockchain servers 130A-130B each have a corresponding blockchain 126 that are part of the distributed ledger 127 (along with any blockchains 126 in the communication systems 120A-120B). In FIG. 2, the communication networks 110A-110C can be any type of communication network 110 as described in FIG. 1. However, the communication networks 110A-110C may be separate communication networks 110A-110B of an entity, such as a corporation or organization. The communication network 110C may be a public network, such as, the Internet or the PSTN.

As shown in FIG. 2, specific number(s) of user communication endpoints 101A-101N, are connected to the individual communication networks 110A-110C. However, any number of user communication endpoints 101 may be connected to any of the communication networks 110A-110C.

The communication networks 110A/110C and 110C/110B are connected to each other via firewalls 250A-250B. The firewalls 250A-250B are used to protect the communication networks 110A/110B from unwanted access from the communication network 110C For example, to prevent hacking of the communication networks 110A-110B The firewalls 250A-250B may be any hardware coupled with firmware/software that can protect the communication networks 110A-110B, such as a network address translator, a Session Boarder Controller, a port/internet firewall, and/or the like.

The distributed system of FIG. 2 allows flexibility in the distributed ledger 127. For example, based on multimedia content for a registered scheduled event uploaded to the communication system 120A, each of the communication systems 120A-120B/blockchain servers 130A-130B will have copies of the blockchain 126 for all registered scheduled events and registered modulation schemes applied to multimedia content for the registered scheduled event stored in the communication systems 120A-120B. Likewise, when multimedia content for a registered scheduled event is uploaded to the communication system 120B, each of the communication systems 120A-120B/blockchain servers 130A-130B will have copies of the blockchain 126 for all registered scheduled events and registered modulation schemes applied to multimedia content for the registered scheduled event stored in the communication system 120B.

Figure 3:
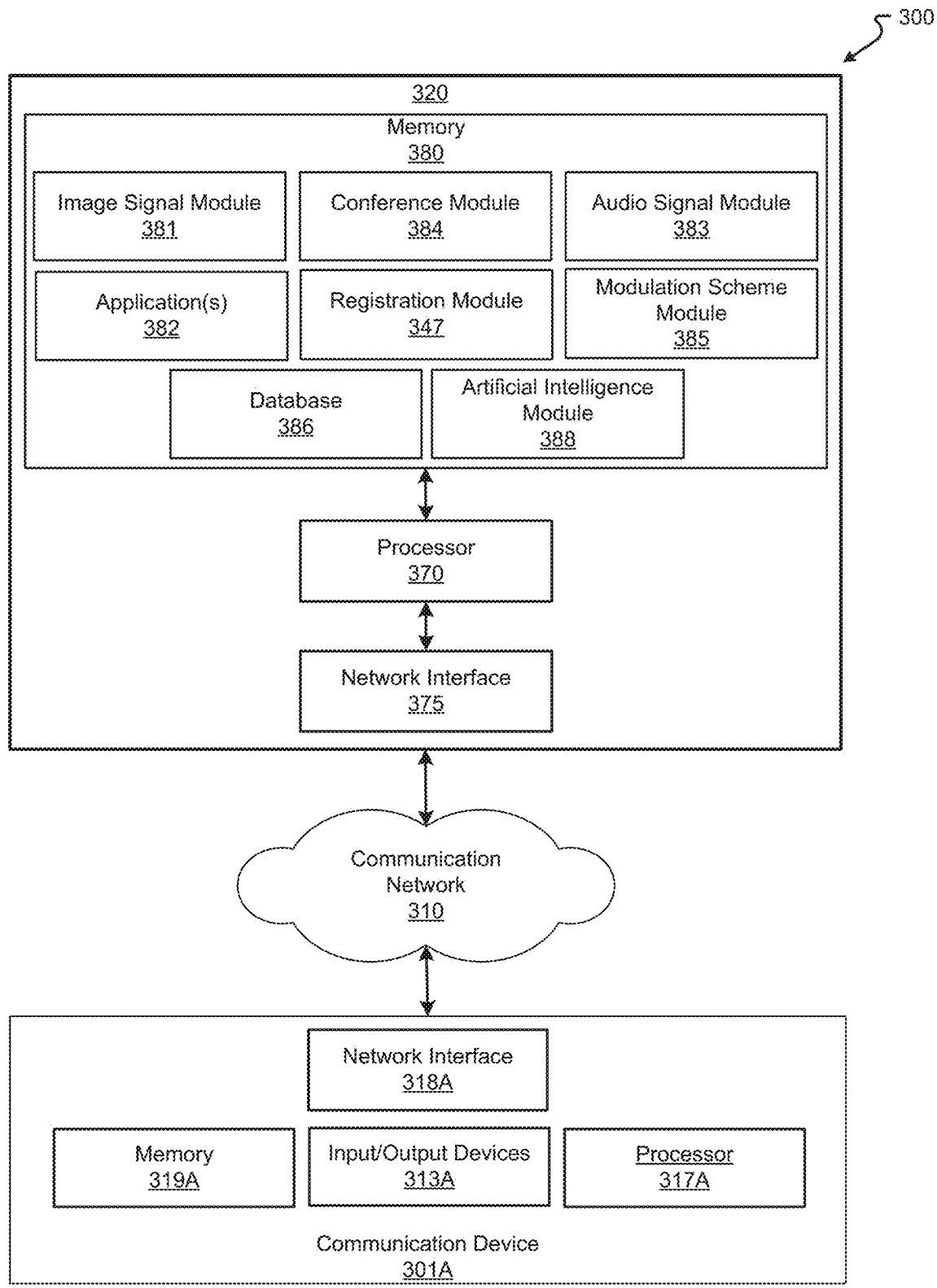
FIG. 3 is a block diagram of an illustrative communication system provided in a computer network system used for processing the multimedia content for authentication and authenticating the multimedia content using a distributed ledger and blockchain according to embodiments of the present disclosure.

FIG. 3 is a block diagram of an illustrative communication system 320 provided in a computer network system 300 used for processing the multimedia content for authentication and authenticating the multimedia content using a distributed ledger and blockchain according to embodiments of the present disclosure. The computer network system 300 may allow users to participate in a conference call with other users, communicate with users over social media, post videos on social media platforms, upload multimedia content such as videos etc. According to an embodiment of the present disclosure, the communication system 320 implements functionality establishing communication sessions for the systems and methods described herein by interacting with the user communication devices (including its hardware and software components) and the various components of a conferencing module 384. For example, communication system 320 includes a memory 380 and a processor 370. Furthermore, the communication system 320 includes a network interface 375. The memory 380 includes an imaging signal module 381, application(s) 382 (used in conjunction with the application(s) 114A of the user communication device 101A), an audio signal module 383, a conferencing module 384, modulation scheme module 385, a database 386, a registration module 387, and an artificial intelligence module 388.

The processor 370 may include a microprocessor, a Central Processing Unit (CPU), a collection of processing units capable of performing serial or parallel data processing functions and the like. The memory 380 may include a number of applications or executable instructions that are readable and executable by the processor 370. For example, the memory 380 may include instructions in the form of one or more modules and/or applications. The memory 380 may also include data and rules in the form of settings that can be used by one or more of the modules and/or applications described herein. The memory 380 may also include one or more communication applications and/or modules, which provide communication functionality of the conferencing module 384. In particular, the communication application(s) and/or module(s) may contain the functionality necessary to enable the conferencing module 384 of the communication system 320 to communicate with communication device 301A as well as other communication devices (not shown) across the communication network 310. As such, the communication application(s) and/or module(s) may have the ability to access communication preferences and other settings, maintained within the database 386, the registration module 387 and/or the memory 380, format communication packets for transmission via the network interface 375, as well as condition communication packets received at the network interface 375 for further processing by the processor 370.

Among other things, the memory 380 may be used to store instructions, that when executed by the processor 370 of the communication system 320, perform the methods as provided herein. In some embodiments of the present disclosure, one or more of the components of the communication system 320 may include a memory. In one example, each component in the communication system 320 may have its own memory. Continuing this example, the memory 380 may be a part of each component in the communication system 320. In some embodiments of the present disclosure, the memory 380 may be located across the communication network 310 for access by one or more components in the communication system 320. In any event, the memory 380 may be used in connection with the execution of application programming or instructions by the processor 370, and for the temporary or long-term storage of program instructions and/or data. As examples, the memory 380 may include Random-Access Memory (RAM), Dynamic RAM (DRAM), Static RAM (SDRAM) or other solid-state memory. Alternatively, or in addition, the memory 380 may be used as data storage and can include a solid-state memory device or devices. Additionally, or alternatively, the memory 380 used for data storage may include a hard disk drive or other random-access memory. In some embodiments of the present disclosure, the memory 380 may store information associated with a user, a timer, rules, recorded audio information, recorded video information and the like. For instance, the memory 380 may be used to store predetermined speech characteristics, private conversation characteristics, video characteristics, information related to mute activation/deactivation, times associated therewith, combinations thereof and the like.

The network interface 375 includes components for connecting the communication system 320 to the communication network 310. In some embodiments of the present disclosure, a single network interface 375 connects the communication system 320 to multiple networks. In some embodiments of the present disclosure, a single network interface 375 connects the communication system 320 to one network and an alternative network interface is provided to connect the communication system 320 to another network. The network interface 375 may include a communication modem, a communication port or any other type of device adapted to condition packets for transmission across a communication network 310 to one or more destination communication devices (not shown), as well as condition received packets for processing by the processor 370. Examples of network interfaces include, without limitation, a network interface card, a wireless transceiver, a modem, a wired telephony port, a serial or parallel data port, a radio frequency broadcast transceiver, a Universal Serial Bus (USB) port or other wired or wireless communication network interfaces.

The type of network interface 375 utilized may vary according to the type of network which the communication system 320 is connected, if at all. An exemplary communication network 310 to which the communication system 320 may connect via the network interface 375 include any type and any number of communication mediums and devices which are capable of supporting communication events (also referred to as "phone calls", "messages", "communications" and "communication sessions" herein), such as voice calls, video calls, chats, e-mails, Teletype (TTY) calls, multimedia sessions or the like. In situations where the communication network 310 is composed of multiple networks, each of the multiple networks may be provided and maintained by different network service providers. Alternatively, two or more of the multiple networks in the communication network 310 may be provided and maintained by a common network service provider or a common enterprise in the case of a distributed enterprise network.

The conferencing module 384 may include conference mixer(s) as well as other conferencing infrastructure that can include hardware and/or software resources of the conferencing module 384 that provide the ability to hold multi-party calls, conference calls and/or other collaborative communications. As can be appreciated, the resources of the conferencing module 384 may depend on the type of multi-party call provided. Among other things, the conferencing module 384 may be configured to provide conferencing of at least one media type between any number of the participants. The conference mixer(s) may be assigned to a particular multi-party call for a predetermined amount of time. In one embodiment of the present disclosure, the conference mixer(s) may be configured to negotiate codecs with each of the user communication devices 101A-101N participating in a multi-party call. Additionally, or alternatively, the conference mixer(s) may be configured to receive inputs (at least including audio inputs) from each participating user communication devices 101A-101N and mix the received inputs into a combined signal which can be provided to each of the user communication devices 101A-101N in the multi-party call.

The modulation scheme module 385 is used to embed/include one or more modulation schemes in the multimedia content that is sent from a user of one or more user communication devices such as user communication device 301A. The sent multimedia content depicts a live event, previously registered with the registration module 347 or the databased 386. The one or more modulation schemes may include, but are not limited to, changes in frequency in the audio signal component of the multimedia content, changes in video content such as changes in the eye color of actor(s) in the video signal component of the multimedia content, additional frequencies that cannot be heard by the human ear added to the audio signal component of the multimedia content, etc. For example, the modulation in frequency keeps changing every 5 to 6 seconds in the multimedia content. Therefore, according to embodiments of the present disclosure, the one or more modulation schemes may include audio frequency modulation, video modulation, etc. The audio frequency modulation may change periodically. As discussed in greater detail below, the one or more modulation schemes may be generated using artificial intelligence using artificial intelligence module 385.

After one or more modulation schemes have been embedded in the multimedia content and the one or more modulation schemes have been registered and associated with the registered scheduled event, the multimedia content with the registered one or more modulation schemes is sent back to the user. Afterwards, the user can freely upload or post the multimedia content knowing that the multimedia content can be later verified as actually reflecting the live event previously registered with the registration module 327. Therefore, it can be easily verified if the posted multimedia content incorporating the one or more registered modulation schemes has been altered.

According to embodiments of the present disclosure, the multimedia content can be uploaded to the communication system 320 or can be retrieved from the databased 386 or the registration module 347 of stored/registered multimedia content. The image signal module 381, the audio signal module 383 and/or the artificial intelligence module 388 may be used in conjunction with the processor 370 to process audio and video signals from the multimedia content. For example, the image signal module 381, the audio signal module 383 and/or the artificial intelligence module 388 are used for embedding the one or more modulation schemes from the modulation scheme module 385 in the multimedia content. Moreover, the image signal module 381, the audio signal module 383 and/or the artificial intelligence module 388 may be used to detect the presence or the absence of modulation schemes for authenticating multimedia content under test by comparing any modulation schemes provided within the multimedia content under test with the registered one or more modulation schemes associated with the registered scheduled. For example, the image signal module 381 performs the function of an image discriminator to determine if any video modulation schemes of the video portion of the multimedia content under test matches the registered modulation schemes associated with the registered scheduled event. Moreover, the audio signal module 383 performs the function of an audio discriminator to determine if any audio modulation schemes of the audio portion of the multimedia content under test matches the registered modulation schemes associated with the registered scheduled event.

Computer network system 300 further includes the user communication device 301A which includes a network interface 318A, a processor 317A, a memory 319A including at least the application 114A and an input/output device 313A. A detailed description of the user communication device 301A is provided in FIG. 4.

Figure 4:
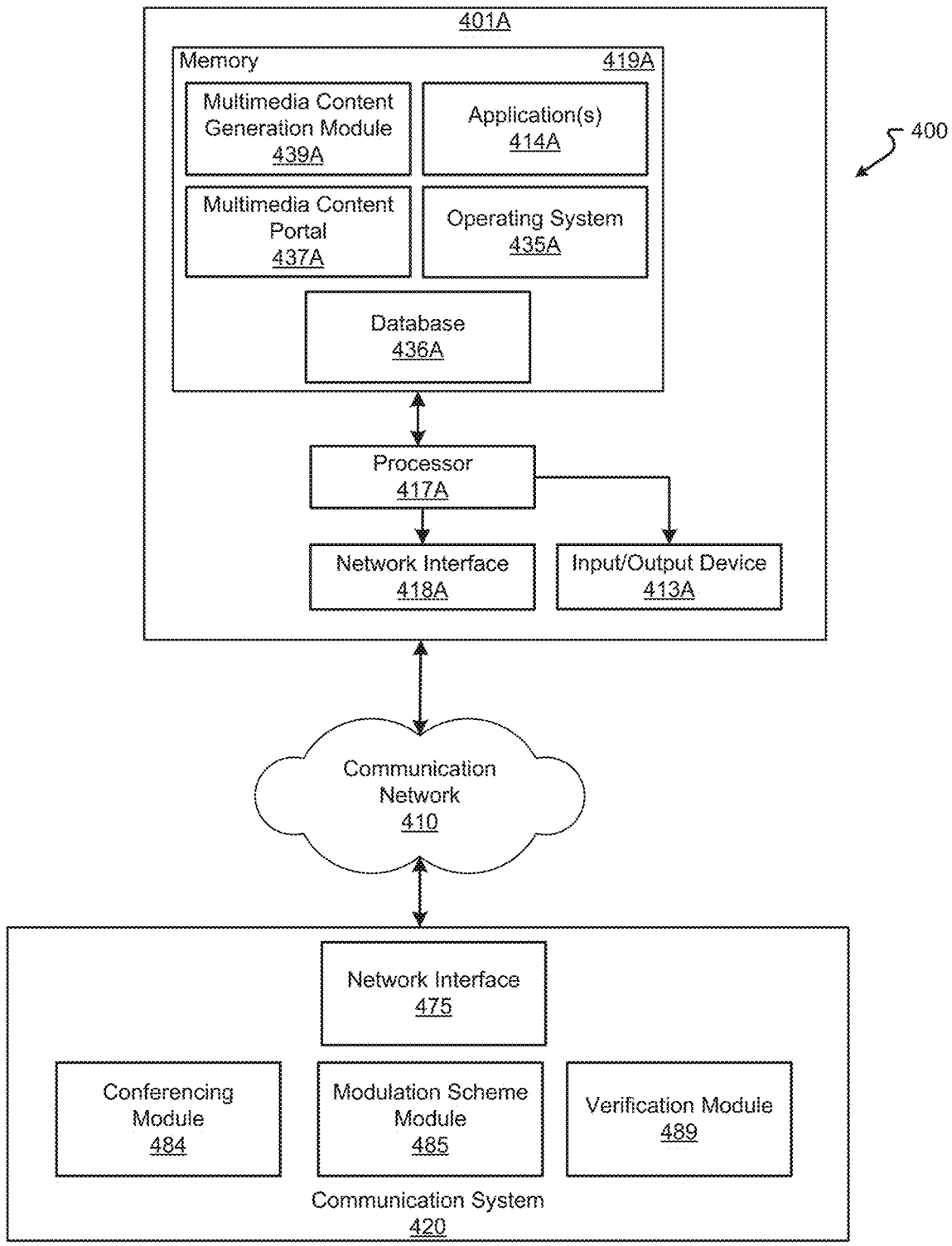
FIG. 4 is a block diagram of an illustrative user communication device provided in a computer network system used for processing the multimedia content for authentication and authenticating the multimedia content using a distributed ledger and blockchain according to embodiments of the present disclosure.

FIG. 4 is a block diagram of an illustrative user communication device 401A provided in a computer network system 400 used for processing the multimedia content for authentication and authenticating the multimedia content using a distributed ledger and blockchain according to embodiments of the present disclosure. The depicted user communication device 401A includes a processor 417A, a memory 419A, an input/output device 413A and a network interface 418A. The memory 419A generally includes an operating system 435A, application(s) 414A, a multimedia content generation module 439A and a multimedia content portal 437A. Although the details of only one user communication device 401A are depicted in FIG. 4, one skilled in the art will appreciate that one or more other user communication devices may be equipped with similar or identical components as the user communication device 401A depicted in detail. Components shown in FIG. 4 may correspond to those shown and described in FIGS. 1-3.

The network interface 418A includes components for connecting the user communication device 401A to the communication network 410. Exemplary user input devices which may be included in the input/output device 413A include, without limitation, a button, a mouse, a trackball, a rollerball, an image capturing device or any other known type of user input device. Exemplary user output devices which may be included in the input/output device 413A include without limitation, a speaker, a light, a Light Emitting Diode (LED), a display screen, a buzzer or any other known type of user output device. In some embodiments of the present disclosure, the input/output device 413A includes a combined user input and user output device, such as a touch-screen.

The processor 417A may include a microprocessor, a CPU, a collection of processing units capable of performing serial or parallel data processing functions, and the like. The processor 417A interacts with the memory 419A, the input/output device 413A and the network interface 418A and may perform various functions of the application(s) 414A, the operating system 435A, the multimedia content generation module 439A and the multimedia content portal 437A.

The memory 419A may include a number of applications such as the application(s) 414A or executable instructions such as the operating system 435A that are readable and executable by the processor 417A. For example, the memory 419A may include instructions in the form of one or more modules and/or applications. The memory 419A may also include data and rules in the form of one or more settings for thresholds that can be used by the application(s) 414A, the operating system 435A, the multimedia content generation module 439A, the multimedia content portal 437A and the processor 417A.

The operating system 435A is a high-level application which enables the various other applications and modules to interface with the hardware components (e.g., the processor 417A, the network interface 418A and the input/output device 413A. According to embodiments of the present disclosure, the multimedia content generation module 439A is used along with the input/output device 413A (e.g., a camera, a video recorder, etc.) to generate multimedia content. The multimedia content portal 437A provides an interface for the user of the user communication device 401A to upload the multimedia content to the communication system 420 after registering a scheduled event related to the multimedia content. Moreover, the multimedia content portal 437A may be provided as a multimedia content authentication portal that provides an interface for the user of the user communication device 401A to upload any multimedia content for verification by the verification module 489 of the communication system 420. According to embodiments of the present disclosure, the verification module 489 includes the image signal module 381, the audio signal module 382, as well as other modules used to authenticate uploaded multimedia content (e.g., multimedia content under test) as discussed in greater detail above with FIG. 3.

Although some applications and modules may be depicted as software instructions residing in the memory 419A and those instructions are executable by the processor 417A, one skilled in the art will appreciate that the applications and modules may be implemented partially or totally as hardware or firmware. For example, an Application Specific Integrated Circuit (ASIC) may be utilized to implement some, or all of the functionality discussed herein.

A detailed description for most of the components of the communication system 420 is provided in FIG. 3 discussed above. The only component not discussed is the verification module 489 which is used to detect modulation schemes for authenticating multimedia content under test uploaded to the communication system 420 from a user communication device such as user communication device 401A. As discussed above, the image signal module 381 performs the function of an image discriminator to determine if any video modulation schemes of the video portion of the multimedia content under test matches the registered modulation schemes associated with the registered scheduled event. Moreover, the audio signal module 383 performs the function of an audio discriminator to determine if any audio modulation schemes of the audio portion of the multimedia content under test matches the registered modulation schemes associated with the registered scheduled event.

Although various modules and data structures for the disclosed systems and methods are depicted as residing on the user communication device 401A, one skilled in the art can appreciate that one, some, or all of the depicted components of the user communication device 401A may be provided by other software or hardware components. For example, one, some or all of the depicted components of the user communication device 401A may be provided by systems operating on the communication system 420. In the illustrative embodiments shown in FIG. 4, the user communication device 401A includes all the necessary logic for the systems and methods disclosed herein so that the systems and methods are performed at the user communication device 401A. Thus, the user communication device 401A can perform the methods disclosed herein without use of logic on the communication system 420.

Figure 5:
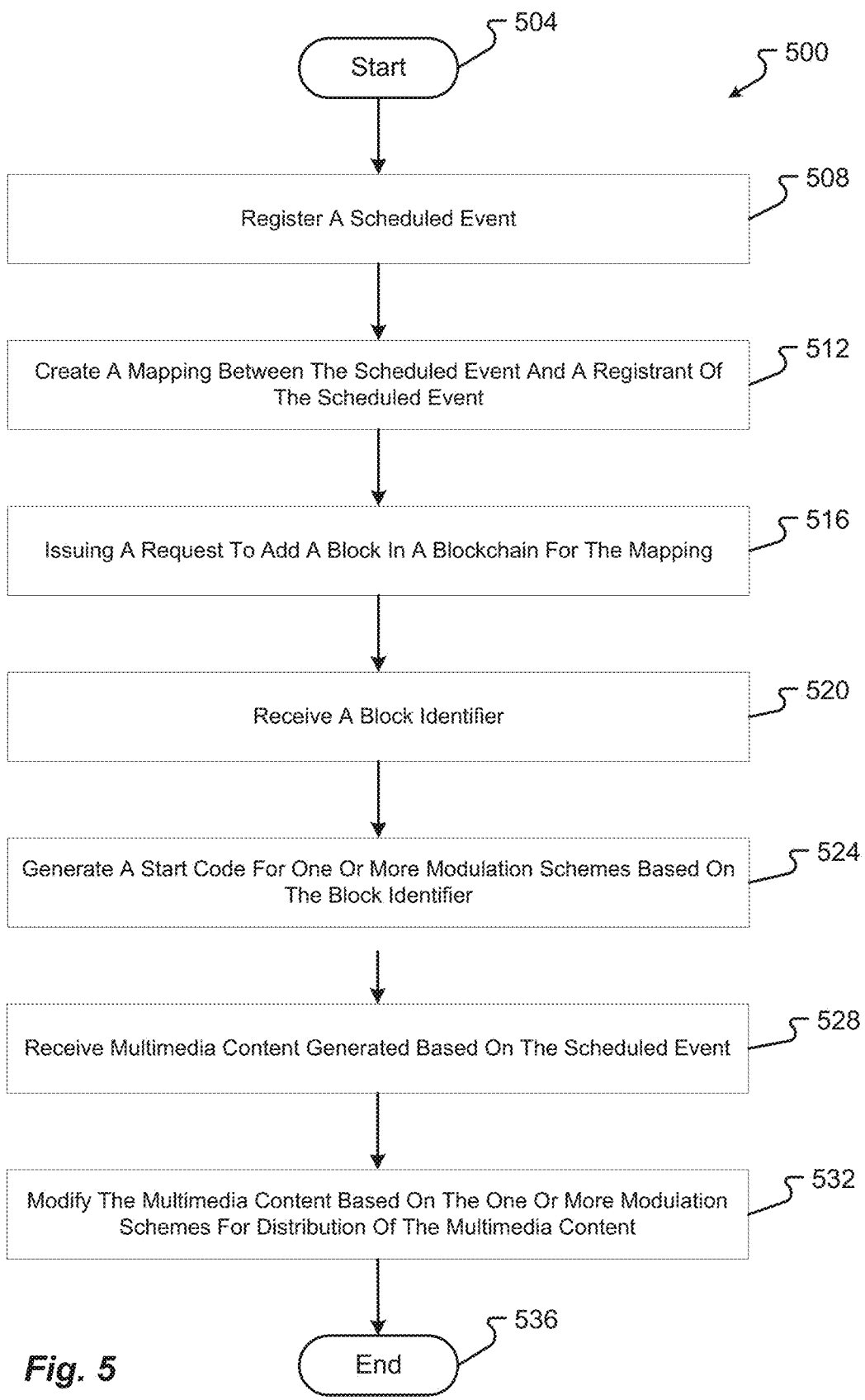
FIG. 5 is a flow diagram of a method used for processing multimedia content for authentication using a distributed ledger and blockchain according to embodiments of the present disclosure.

FIG. 5 is a flow diagram of a method 500 used for processing multimedia content for authentication using a distributed ledger and blockchain according to embodiments of the present disclosure. While a general order of the steps of method 500 is shown in FIG. 5, method 500 can include more or fewer steps or can arrange the order of the steps differently than those shown in FIG. 5. Further, two or more steps may be combined into one step. Generally, method 500 starts with a START operation at step 504 and ends with an END operation at step 536. Method 500 can be executed as a set of computer-executable instructions executed by a data-processing system and encoded or stored on a computer readable medium. Hereinafter, method 500 shall be explained with reference to the systems, the components, the modules, the software, the data structures, the user interfaces, etc. described in conjunction with FIGS. 1-4.

Method 500 starts with the START operation at step 504 and proceeds to step 508, where the processor 370 and the registration module 347 of the communication system 320 register a scheduled event. According to an embodiment of the present disclosure, a scheduled event is an event that is to take place in the future (e.g., one hour from the present time, one day from the present time, one week from the present time, one month from the present time, etc.). An event may include, but is not limited to, a conference call, a press conference, an interview, or a phone call, etc. After registering the scheduled event at step 508, method 500 proceeds to step 512, where the processor 370 and the registration module 237 of the communication system 320, create a mapping between the scheduled event and a registrant of the scheduled event. According to embodiments of the present disclosure, the mapping may include more than the information for identifying the registrant and may include, but not limited to, a location of the event, a time of the event, participants to the event, etc. In response to creating a mapping between the scheduled event and a registrant of the scheduled event at step 512, method 500 proceeds to step 516, where the processor 370 of the communication system 320, issues a request to add a block in a blockchain for the mapping. In response to the request to add a block in a blockchain for the mapping, method 500 proceeds to step 520, where the processor 370 of the communication system 320, receives a block identifier.

After receiving the block identifier at step 520, method 500 proceeds to step 524, where the processor 370 of the communication system 320, generates a start code for one or more modulation schemes based on the block identifier. According to an embodiment of the present disclosure, the one or more modulation schemes is generated using AI from the artificial intelligence module 388. After generating a start code for one or more modulation schemes based on the block identifier at step 524, method 500 proceeds to step 528, where the processor 370 of the communication system 320, receives multimedia content generated based on the scheduled event. After receiving the multimedia content generated based on the scheduled event at step 528, method 500 proceeds to step 532, where the processor 370 of the communication system 320, modifies the multimedia content based on the one or more modulation schemes for distribution of the multimedia content. After modifying the multimedia content based on the one or more modulation schemes for distribution of the multimedia content at step 532, method 500 ends with END operation at step 536.

Figure 6:
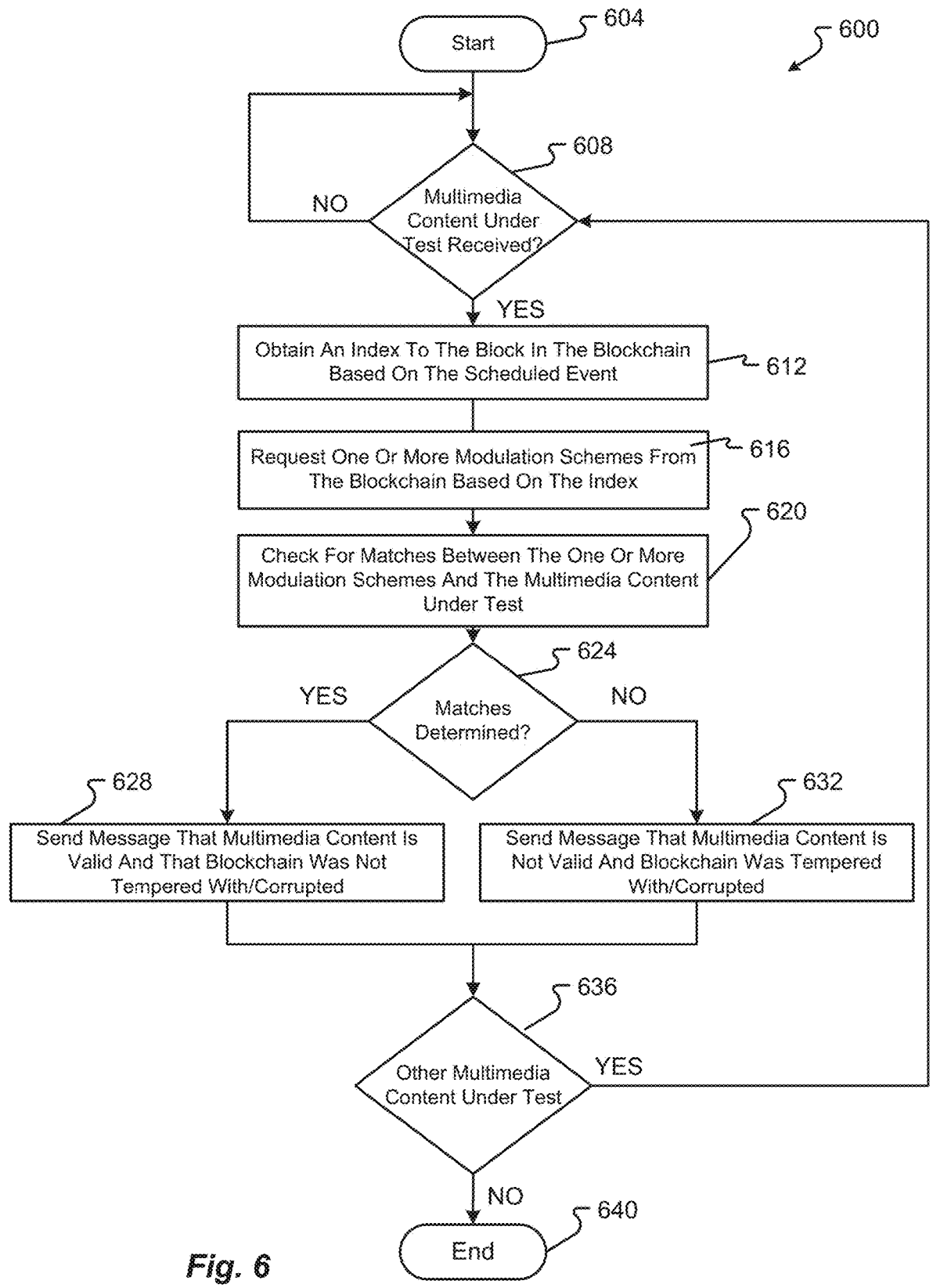
FIG. 6 is a flow diagram of a method used for authenticating multimedia content using a distributed ledger and blockchain according to embodiments of the present disclosure.

FIG. 6 is a flow diagram of a method 600 used for authenticating multimedia content using a distributed ledger and blockchain according to embodiments of the present disclosure. While a general order of the steps of method 600 is shown in FIG. 6, method 600 can include more or fewer steps or can arrange the order of the steps differently than those shown in FIG. 6. Further, two or more steps may be combined into one step. Generally, method 600 starts with a START operation at step 604 and ends with an END operation at step 640. Method 600 can be executed as a set of computer-executable instructions executed by a data-processing system and encoded or stored on a computer readable medium. Hereinafter, method 600 shall be explained with reference to the systems, the components, the modules, the software, the data structures, the user interfaces, etc. described in conjunction with FIGS. 1-4.

Method 600 starts with the START operation at step 604 and proceeds to decision step 608, where the processor 370 of the communication system 320 determines if multimedia content under test has been received. According to embodiments of the present disclosure, the multimedia content under test is perceived to be associated with a registered scheduled event. If no multimedia content under test has been received (NO) at decisions step 608, method 600 returns to decision step 608. If multimedia content under test has been received (YES) at decisions step 608, method 600 proceeds to step 612, where the processor 370 of the communication system 320 obtains an index to the block in the blockchain based on the scheduled event. After obtaining the index to the block in the blockchain based on the scheduled event at step 612, method 600 proceeds to step 616, where the processor 370 of the communication system 320, requests one or more modulation schemes from the blockchain based on the index.

After requesting the one or more modulation schemes from the blockchain based on the index at step 616, method 600 proceeds to step 620, where the processor 370 of the communication system 320 checks for matches between one or more modulation schemes of the multimedia content under test and the one or more modulation schemes from the blockchain. In response to checking for matches between the one or more modulation schemes of the multimedia content under test and the one or more modulation schemes from the blockchain, method 600 proceeds to decision step 624, where the processor 370 of the communication system 320 determines if a match exists. According to embodiments of the present disclosure a match must exists between each of the one or more modulation schemes of the multimedia content under test and the one or more modulation schemes from the blockchain. If a match exists (YES) at decision step 624, method 600 proceeds to step 628, where the processor 370 of the communication system 320 sends a message that the multimedia content is valid and the blockchain was not tampered with or corrupted. If a match does not exist (NO) at decision step 624, method 600 proceeds to step 632, where the processor 370 of the communication system 320 sends a message that the multimedia content is not valid and the blockchain was tampered with or corrupted. After sending messages in either step 628 or 632, method 600 proceeds to decision step 636, where the processor 370 of the communication system 320 determines if there exist other multimedia content under test for evaluation. If other multimedia content under test for evaluation exists (YES) at decision step 636, method 600 returns to decision step 608. If no other multimedia content under test for evaluation exists (NO) at decision step 636, method 600 ends with END operation at step 640.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments and/or configurations illustrated herein show the various components of the system collocated, certain components of the system can be located remotely, at distant portions of a distributed network, such as a LAN and/or the Internet or within a dedicated system. Thus, it should be appreciated, that the components of the system can be combined in to one or more devices, such as a server or collocated on a particular node of a distributed network, such as an analog and/or digital communications network, a packet-switch network or a circuit-switched network. It will be appreciated from the preceding description and for reasons of computational efficiency, that the components of the system can be arranged at any location within a distributed network of components without affecting the operation of the system. For example, the various components can be located in a switch such as a Privat Branch Exchange (PBX) and media server, gateway, in one or more communications devices, at one or more users' premises or some combination thereof. Similarly, one or more functional portions of the system could be distributed between a communications device(s) and an associated computing device.

Furthermore, it should be appreciated that the various links connecting the elements can be wired or wireless links, or any combination thereof or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics and may take the form of acoustic or light waves, such as those generated during radio-wave and infrared data communications.

Also, while the flowcharts have been discussed and illustrated in relation to a particular sequence of events, it should be appreciated that changes, additions and omissions to this sequence can occur without materially affecting the operation of the disclosed embodiments, configuration and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL) special purpose computer, any comparable means or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids and others), and other hardware known in the art. Some of these devices include processors (e.g., a single or multiple microprocessors), memory, nonvolatile storage, input devices and output devices. Furthermore, alternative software implementations including, but not limited to, distributed processing or component/object distributed processing, parallel processing or virtual machine processing can also be constructed to implement the methods described herein.

In yet another embodiment, the disclosed methods may be readily implemented in conjunction with software using object or object-oriented software development locations that provide portable source code that can be used on a variety of computer or workstation platforms. Alternatively, the disclosed system may be implemented partially or fully in hardware using standard logic circuits or Very Large-scale Integration (VLSI) design.

Whether software or hardware is used to implement the systems in accordance with this disclosure is dependent on the speed and/or efficiency requirements of the system, the particular function and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor or the like. In these instances, the systems and methods of this disclosure can be implemented as program embedded on personal computer such as an applet, JAVA® or Computer-generated Imagery (CGI) script, as a resource residing on a server or computer workstation, as a routine embedded in a dedicated measurement system, system component or the like. The system can also be implemented by physically incorporating the system and/or method into a software and/or hardware system.

Although the present disclosure describes components and functions implemented in the aspects, embodiments and/or configurations with reference to particular standards and protocols, the aspects, embodiments and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments and/or configurations, includes components, methods, processes, systems and/or apparatus substantially as depicted and described herein, including various aspects, embodiments, configurations embodiments, sub combinations and/or subsets thereof. Those of skill in the art will understand how to make and use the disclosed aspects, embodiments and/or configurations after understanding the present disclosure. The present disclosure, in various aspects, embodiments and/or configurations, includes providing devices and processes in the absence of items not depicted and/or described herein or in various aspects, embodiments and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments and/or configurations for the purpose of streamlining the disclosure. The features of the aspects, embodiments and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment and/or configuration. Thus, the following claims are hereby incorporated into this Detailed Description, with each claim standing on its own as a separate preferred embodiment of the disclosure.

Moreover, though the description has included description of one or more aspects, embodiments and/or configurations and certain variations and modifications, other variations, combinations and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein and without intending to publicly dedicate any patentable subject matter.

Embodiments of the present disclosure include a method. The method includes registering, by a processing, a scheduled event, creating, by the processor, a mapping between the scheduled event and a registrant of the scheduled event and in response to creating the mapping between the scheduled event and the registrant, issuing, by the processor, a request to add a block in a blockchain for the mapping. The method also includes in response to the request, receiving, by the processor, a block identifier, generating, by the processor, a start code for one or more modulation schemes based on the block identifier, receiving, by the processor, multimedia content generated based on the scheduled event and modifying, by the processor, the multimedia content based on the one or more modulation schemes for distribution of the multimedia content.

Aspects of the above method include wherein the scheduled event is a conference call, a press conference or a phone call.

Aspects of the above method include wherein the audio frequency modulation changes periodically.

Aspects of the above method include wherein the one or more modulation schemes include video modulation.

Aspects of the above method include wherein the video modulation includes changes in eye color for actors in the multimedia content.

Aspects of the above method include wherein the one or more modulation schemes are generated using artificial intelligence.

Aspects of the above method further include receiving, by the processor, multimedia content under test, perceived to be associated with the scheduled event, obtaining, by the processor, an index to the block in the blockchain based on the scheduled event, requesting, by the processor, the one or more modulation schemes from the blockchain based on the index and checking, by the processor, for matches between the one or more modulation schemes of the multimedia content under test and the one or more modulation schemes from the blockchain.

Aspects of the above method include wherein the multimedia content under test is a deepfake of the multimedia content.

Aspects of the above method include wherein image signal processing and audio digital signal processing are used for checking for matches between the one or more modulation schemes of the multimedia content under test and the one or more modulation schemes from the blockchain.

Aspects of the above method include wherein in response to determining that matches do not exist between the one or more modulation schemes of the multimedia content under test and the one or more modulation schemes from the blockchain, providing notice, by the processor, that the multimedia content under test is not the multimedia content generated based on the scheduled event.

Aspects of the above method include wherein in response to determining that matches exist between the one or more modulation schemes of the multimedia content under test and the one or more modulation schemes from the blockchain, providing notice, by the processor, that the multimedia content under test is the multimedia content generated based on the scheduled event.

Embodiments of the present disclosure include a system. The system includes a processor and a memory coupled with and readable by the processor and having stored therein a set of instructions which, when executed by the processor, causes the processor to: register a scheduled event, create a mapping between the scheduled event and a registrant of the scheduled event and in response to creating the mapping between the scheduled event and the registrant, issue a request to add a block in a blockchain for the mapping. The processor is further caused to in response to the request, receive a block identifier, generate a start code for one or more modulation schemes based on the block identifier, receive multimedia content generated based on the scheduled event and modify the multimedia content based on the one or more modulation schemes for distribution of the multimedia content.

Aspects of the above system include wherein the scheduled event is a conference call, a press conference or a phone call.

Aspects of the above system include wherein the one or more modulation schemes are generated using artificial intelligence.

Aspects of the above system include wherein the processor is further caused to receive multimedia content under test, perceived to be associated with the scheduled event, obtain an index to the block in the blockchain based on the scheduled event, request the one or more modulation schemes from the blockchain based on the index and check for matches between the one or more modulation schemes of the multimedia content under test and the one or more modulation schemes from the blockchain.

Embodiment of the present disclosure include a computer readable medium. The computer readable medium including microprocessor executable instructions that, when executed by the microprocessor, perform the following functions: register a scheduled event, create a mapping between the scheduled event and a registrant of the scheduled event and in response to creating the mapping between the scheduled event and the registrant. The microprocessor further performs the following functions: issue a request to add a block in a blockchain for the mapping, in response to the request, receive a block identifier, generate a start code for one or more modulation schemes based on the block identifier, receive multimedia content generated based on the scheduled event and modify the multimedia content based on the one or more modulation schemes for distribution of the multimedia content.

Aspects of the above computer readable medium include wherein the scheduled event is a conference call, a press conference or a phone call.

Aspects of the above computer readable medium include wherein the one or more modulation schemes are generated using artificial intelligence.

Aspects of the above computer readable medium include wherein the microprocessor further performs the functions of: receive multimedia content under test, perceived to be associated with the scheduled event, obtain an index to the block in the blockchain based on the scheduled event, request the one or more modulation schemes from the blockchain based on the index and check for matches between the one or more modulation schemes of the multimedia content under test and the one or more modulation schemes from the blockchain.

What is claimed is:

1. A method, comprising:
registering, by a processor, a scheduled event;
creating, by the processor, a mapping between the scheduled event and a registrant of the scheduled event;
in response to creating the mapping between the scheduled event and the registrant, issuing, by the processor, a request to add a block in a blockchain for the mapping;
in response to the request, receiving, by the processor, a block identifier;
generating, by the processor, a start code for one or more modulation schemes based on the block identifier;
receiving, by the processor, multimedia content generated based on the scheduled event;
modifying, by the processor, the multimedia content based on the one or more modulation schemes for distribution of the multimedia content;
receiving, by the processor, multimedia content under test, perceived to be associated with the scheduled event;
obtaining, by the processor, an index to the block in the blockchain based on the scheduled event;
requesting, by the processor, one or more modulation schemes from the blockchain based on the index; and
checking, by the processor, for matches between one or more modulation schemes of the multimedia content under test and the one or more modulation schemes from the blockchain.

2. The method according to claim 1, wherein the scheduled event is a conference call, a press conference or a phone call.

3. The method according to claim 1, wherein the one or more modulation schemes include audio frequency modulation.

4. The method according to claim 3, wherein the audio frequency modulation changes periodically.

5. The method according to claim 1, wherein the one or more modulation schemes include video modulation.

6. The method according to claim 5, wherein the video modulation includes changes in eye color for actors in the multimedia content.

7. The method according to claim 1, wherein the one or more modulation schemes are generated using artificial intelligence.

8. The method according to claim 1, wherein the multimedia content under test is a deepfake of the multimedia content.

9. The method according to claim 1, wherein image signal processing and audio digital signal processing are used for checking for matches between the one or more modulation schemes of the multimedia content under test and the one or more modulation schemes from the blockchain.

10. The method according to claim 1, wherein in response to determining that matches do not exist between the one or more modulation schemes of the multimedia content under test and the one or more modulation schemes from the blockchain, providing notice, by the processor, that the multimedia content under test is not the multimedia content generated based on the scheduled event.

11. The method according to claim 1, wherein in response to determining that matches exist between the one or more modulation schemes of the multimedia content under test and the one or more modulation schemes from the blockchain, providing notice, by the processor, that the multimedia content under test is the multimedia content generated based on the scheduled event.

12. A system, comprising:
a processor; and
a memory coupled with and readable by the processor and having stored therein a set of instructions which, when executed by the processor, causes the processor to:
register a scheduled event;
create a mapping between the scheduled event and a registrant of the scheduled event;
in response to creating the mapping between the scheduled event and the registrant, issue a request to add a block in a blockchain for the mapping;
in response to the request, receive a block identifier;
generate a start code for one or more modulation schemes based on the block identifier;
receive multimedia content generated based on the scheduled event;
modify the multimedia content based on the one or more modulation schemes for distribution of the multimedia content;
receive multimedia content under test, perceived to be associated with the scheduled event;
obtain an index to the block in the blockchain based on the scheduled event;
request one or more modulation schemes from the blockchain based on the index; and
check for matches between one or more modulation schemes of the multimedia content under test and the one or more modulation schemes from the blockchain.

13. The system according to claim 12, wherein the scheduled event is a conference call, a press conference or a phone call.

14. The system according to claim 12, wherein the one or more modulation schemes are generated using artificial intelligence.

15. The system according to claim 12, wherein the multimedia content under test is a deepfake of the multimedia content.

16. The system according to claim 12, wherein the one or more modulation schemes include video modulation.

17. The system according to claim 16, wherein the video modulation includes changes in eye color for actors in the multimedia content.

18. A non-transitory computer readable medium comprising microprocessor executable instructions that, when executed by the microprocessor, perform the following functions:
register a scheduled event;
create a mapping between the scheduled event and a registrant of the scheduled event;
in response to creating the mapping between the scheduled event and the registrant, issue a request to add a block in a blockchain for the mapping;
in response to the request, receive a block identifier;
generate a start code for one or more modulation schemes based on the block identifier;
receive multimedia content generated based on the scheduled event;

modify the multimedia content based on the one or more modulation schemes for distribution of the multimedia content;

receive multimedia content under test, perceived to be associated with the scheduled event;

obtain an index to the block in the blockchain based on the scheduled event;

request one or more modulation schemes from the blockchain based on the index; and check for matches between one or more modulation schemes of the multimedia content under test and the one or more modulation schemes from the blockchain.

19. The non-transitory_computer readable medium according to claim 18, wherein the scheduled event is a conference call, a press conference or a phone call.

20. The non-transitory_computer readable medium according to claim 18, wherein the one or more modulation schemes are generated using artificial intelligence.

\* \* \* \* \*